(12) United States Patent
Edelmann

(10) Patent No.: US 7,295,377 B2
(45) Date of Patent: Nov. 13, 2007

(54) COMPENSATING HEAD MOUNTED DISPLAY DEVICE

(75) Inventor: Martin Edelmann, Aalen (DE)

(73) Assignee: Carl-Zeiss-Stiftung, Heidenheim (DE)

( * ) Notice: Subject to any disclaimer, the term of this patent is extended or adjusted under 35 U.S.C. 154(b) by 0 days.

(21) Appl. No.: 10/821,788

(22) Filed: Apr. 9, 2004

(65) Prior Publication Data

US 2004/0257663 A1    Dec. 23, 2004

(30) Foreign Application Priority Data

Apr. 10, 2003    (DE)    ................ 103 16 533

(51) Int. Cl.
*G02B 27/14* (2006.01)
*G09G 5/00* (2006.01)

(52) U.S. Cl. .......................... 359/630; 345/8
(58) Field of Classification Search ........ 359/630–634, 359/636, 637, 639, 13, 14, 566, 567, 572; 345/7–9; 348/115
See application file for complete search history.

(56) References Cited

U.S. PATENT DOCUMENTS

| | | | |
|---|---|---|---|
| 5,162,928 A * | 11/1992 | Taniguchi et al. .......... 359/630 |
| 5,363,220 A * | 11/1994 | Kuwayama et al. .......... 359/13 |
| 5,379,132 A * | 1/1995 | Kuwayama et al. ........ 359/630 |
| 5,396,349 A | 3/1995 | Roberts et al. |
| 5,432,623 A * | 7/1995 | Egan et al. .................... 359/15 |
| 5,436,763 A | 7/1995 | Chen et al. |
| 5,526,183 A | 6/1996 | Chen |
| 5,661,604 A | 8/1997 | Kuba |
| 6,181,475 B1 | 1/2001 | Togino et al. |
| 6,945,648 B2 * | 9/2005 | Schindler et al. ........... 359/632 |
| 2001/0021068 A1 | 9/2001 | Togino et al. |
| 2001/0024177 A1* | 9/2001 | Popovich ........................ 345/8 |
| 2001/0038361 A1* | 11/2001 | Tanijiri et al. .................. 345/8 |

FOREIGN PATENT DOCUMENTS

| | | |
|---|---|---|
| EP | 0 681 710 B1 | 7/1998 |
| JP | 2002142025 A | 5/2001 |
| JP | 2001228436 A | 8/2001 |
| JP | 2001235707 A | 8/2001 |
| JP | 2001337292 A | 12/2001 |
| WO | WO96/36898 | 11/1996 |

* cited by examiner

*Primary Examiner*—Alicia M Harrington
(74) *Attorney, Agent, or Firm*—Patterson, Thuente, Skaar & Christensen, P.A.

(57) ABSTRACT

An HMD device including an image-generating unit for generating a polychromatic image and deflection optics having first and second partial optics. The deflection optics project the image such tat it is perceivable by a user wearing the HMD device. The two partial optics each contain a diffractive optical unit for beam deflection, which are designed such that their dispersion errors compensate each other.

26 Claims, 1 Drawing Sheet

COMPENSATING HEAD MOUNTED DISPLAY DEVICE

This application claims priority to German Application No. 103 16 533.9 filed Apr. 10, 2003. Said application is incorporated by reference herein.

BACKGROUND OF THE INVENTION

The present invention relates to an HMD device (Head Mounted Display device).

In such devices, a wide field angle and a large exit pupil are generally desired. As a result, in known HMD devices, it is required to provide complex and large optics, making the weight of the HMD device disadvantageously high. Existing approaches using diffractive optics have the disadvantage that they only function in a monochromatic manner.

In view of the above, it is the object of the present invention to provide an HMD device which has a compact and low-weight design and simultaneously allows polychromatic operation thereof.

SUMMARY OF THE INVENTION

According to the invention, the object is achieved by an HMD device comprising an image-generating unit for generating a polychromatic image, deflection optics comprising first and second partial optics, said deflection optics projecting the image such that it is perceivable by a user wearing said HMD device, wherein each of said two partial optics contains a diffractive optical unit for beam deflection, which are designed such that their dispersion errors compensate each other.

By providing the two diffractive optical units, whose dispersion errors compensate each other, it is achieved, on the one hand, that the HMD device may be polychromatically operated. On the other hand, the use of the diffractive optical units leads to a very compact design of the HMD device, because very large angles of deflection are realizable with the diffractive optical units.

Since an HMD device is often designed glasses- or helmet-like and the image-generating unit is, thus, not arranged in front of the observer's eye, but laterally on the observer's head, the use of two diffractive optical units is particularly advantageous. Thus, using the first diffractive optical unit, the polychromatic image generated by the image-generating unit, which is radiated, in many cases, in a forward direction parallel to the viewing direction, may be deflected toward the second diffractive optical unit, which is arranged directly in front of the observer's eye, and the radiation of the image is then deflected toward the observer's eye by the second diffractive optical unit. For this purpose, it is particularly advantageous if the first diffractive optical unit is provided as a transmissive optical unit and the second diffractive optical unit is designed to be reflective. Also, both diffractive optical units may, of course, be either reflective or transmissive, and it is further possible that the first diffractive optical unit may be reflective and the second diffractive optical unit may be transmissive.

The compensation of the dispersion errors of the diffractive optical units referred to herein means that dispersion-related imaging errors are eliminated as completely as possible upon deflection, but are at least smaller than in the case where only one diffractive optical unit is used.

In a preferred embodiment of the HMD device according to the invention, use is made of a non-zeroth order of diffraction of the diffractive optical units for beam deflection, wherein, in particular, the same order of diffraction is used in both diffractive optical units.

Using a desired non-zeroth order of diffraction, the HMD device is very flexibly adjustable to predetermined marginal conditions. The embodiment wherein the same order of diffraction is used for both diffractive optical units leads to very good results of compensation.

Further, in the HMD device according to the invention, the diffractive optical unit of the first and/or second partial optics may be provided as a line grating. Nowadays, such a line grating is easy to manufacture with the required precision. Thus, it may be formed, for example, by means of holographic methods or by means of microstructuring methods known from the manufacture of semiconductors.

In particular, the line grating may merely serve the purpose of beam deflection. In this case, the focussing (imaging) effect is realized by further refractive elements. The deflection optics may be optimized for the specific case of application in a particularly easy manner by separation of the deflecting effect, on the one hand, and the focussing effect, on the other hand.

Of course, it is also possible that the line grating may serve the purpose of beam deflection and, at the same time, as an imaging (focussing) element. This allows to realize extremely compact deflection optics, so that the overall design of the HMD device may be small and light.

It is particularly advantageous if, for the imaging effect of the diffractive optical unit, the grating constant of the latter is varied. This allows the desired imaging effect to be adjusted with extreme precision.

The line grating may be formed on or in a curved, in particular a spherically curved, material interface. Said material interface may be, for example, an interface of a refractive element of the deflection optics. This allows to realize deflection optics, which are compact and comprise few elements, thus allowing to save weight. Forming the grating in or on a spherically curved material interface has the advantage that spherically curved interfaces can be manufactured with extremely high precision. The desired or required aspherical effect may then be realized by means of the grating thus formed (in which case the grating thus serves the purpose of beam deflection and imaging). Thus, an easy-to-manufacture optical element having excellent imaging properties is provided.

It is further possible to form the line grating on or in a planar material interface. Of course, this further simplifies manufacture because planar surfaces are extremely well manageable during manufacture and planar surfaces allow a grating to be formed thereon with very high precision. In this embodiment, in order to provide the effect of curved material interfaces, if this is desired, the line grating may be formed accordingly. In particular, the grating constant (or groove width, respectively) is suitably varied, causing the thus formed optical element to act as though it comprised a curved material interface.

A particularly preferred embodiment of the HMD device according to the invention consists in that the second partial optics arranged in front of the eye of a user wearing the HMD device are provided so as to allow the user to perceive his environment through said optics. This enables an augmented representation in the HMD device according to the invention.

In particular, the diffractive optical unit of the second partial optics is provided such that the diffractive optical unit of the second partial optics is transmissive for the user in the zeroth order of diffraction. Thus, a very compact HMD device is provided which is suitable for augmented representations.

Further, the second partial optics may have a refractive effect for correction of visual deficiencies of the user. The device according to the invention will then already incorporate glasses for correction of visual deficiencies.

The image-generating unit may be a luminous display, for example a transmissive or reflective LCD, an LCoS display or an LED, or a non-luminous display. In particular, the image-generating unit may comprise a spatial light modulator, such as, for example, a tilting mirror matrix or an LCD module, or an LCoS module which is correspondingly controlled, wherein a separate light source is also provided, if necessary.

In particular, the HMD device may be provided such that the observer can only perceive the generated polchromatic image or that he perceives the generated image as superimposed on the environment (augmented representation). The deflection optics preferably generate a virtual (especially also an enlarged) image for the user which he then perceives. The HMD device may generate images for one or both eyes, the images for both eyes being represented, in particular, to create a three-dimensional impression of the image.

Of course, the HMD device may comprise still further elements, in particular if they are required for operation. Thus, for example, a computer may be provided which contains the image data of the images to be represented and transmits said image data (e.g. via a wireless link) to the image-generating unit, or which directly controls the image-generating unit in a suitable manner.

DESCRIPTION OF THE FIGURE

The invention is explained in more detail below, essentially by way of example, with reference to the only drawing.

DETAILED DESCRIPTION OF THE PREFERRED EMBODIMENT

Figure 1:
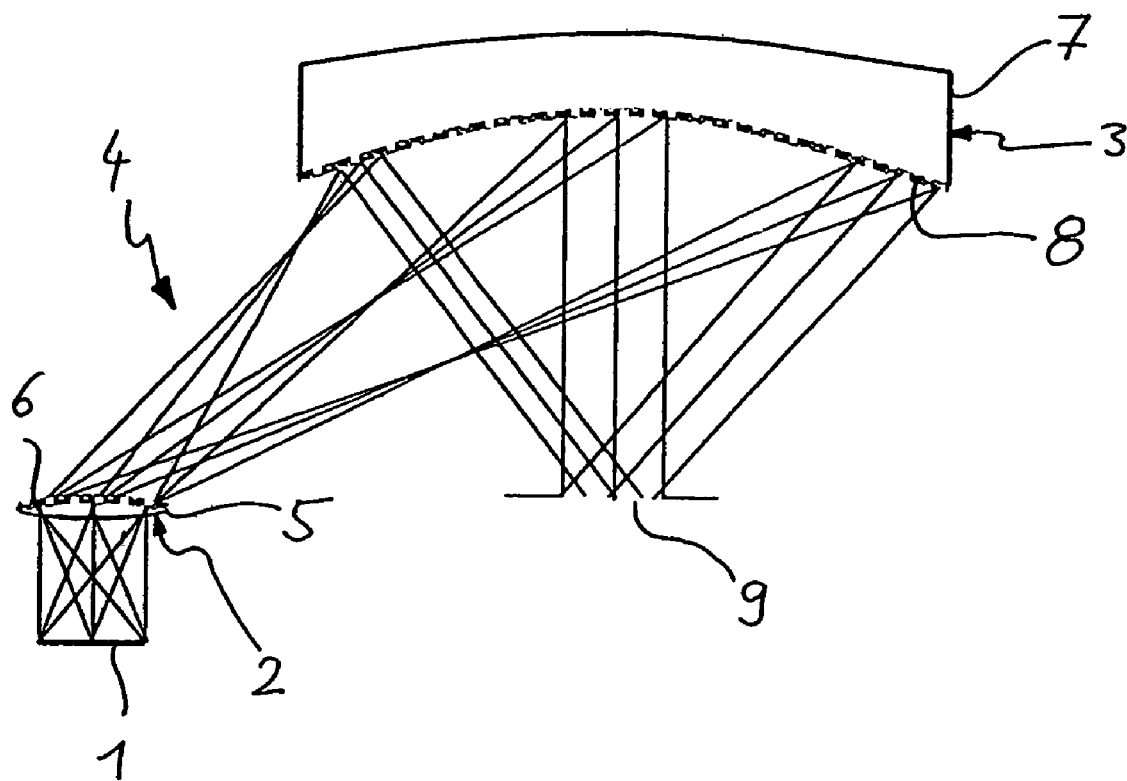
FIG. 1 schematically shows the optical structure of an embodiment of the HMD device according to the invention.

In this embodiment, the HMD device comprises an image-generating unit 1 for generating polychromatic images, said image-generating unit 1 being followed, in this order, by first partial optics 2 which are transmissive and by second partial optics 3 which are part reflective and part transmissive. Both partial optics 2 and 3 form a deflecting unit 4 and are each provided as hybrid optical units containing both refractive and diffractive elements.

As is evident from the schematic representation of FIG. 1, the first partial optics 2 comprise a first lens 5 (which is indicated in order to represent one or more refractive optical elements) as well as a first line grating 6 formed on the curved material interface of the first lens 5 facing away from the image-generating unit 1. In a similar manner, the second partial optics comprise a second lens 7 (shown in order to represent one or more refractive elements), with a second line grating 8 being provided on the curved material interface facing the observer's eye. The individual grating grooves of both line gratings 6 and 8 extend perpendicular to the drawing plane and both line gratings each have a grating constant which does not change.

As is evident from the optical ray paths indicated by way of example, the image-generating unit 1 generates a polychromatic image which is projected at the desired virtual image width (here, for example, at infinity) into the observer's eye, wherein the entrance pupil of the eye is designated by the reference numeral 9. In the depicted embodiment, the first partial optics 2 have a first optical axis and the second partial optics 3 have a second optical axis. The first optical axis is substantially laterally displaced from and substantially parallel to the second optical axis. The diffractive optical unit of the first partial optics 2 deflects light to the diffractive optical unit of the second partial optics 3. For this purpose, the first line grating 6 is provided such that the first order of diffraction indicated generates the desired deflection in the direction toward the second partial optics 3. In this case, the line grating 6 is optimized such that the highest diffraction efficiency is concentrated in the first order of diffraction. As is known to the person skilled in the art, this may be determined by the profile shape. In particular, blazed profile shapes may be employed here. The second line grating 8 is similarly provided such that the first order of diffraction realizes the desired deflection toward the entrance pupil 9 of the observer's eye. Both line gratings 6 and 8 are further embodied such that the dispersion errors occurring during diffraction of polychromatic light just compensate each other, it being possible, of course, to effect an optimization to make said compensation as complete as possible. This has the advantageous effect that the virtually projected image is presented to the observer without any chromatic errors. Using the line gratings 6 and 8, a very large angle of deflection may be realized, so that the overall design of the deflection optics 4 is very compact.

The second partial optics 3 may be provided such, in particular, that the grating is transmissive for the observer in its zeroth order of diffraction, which enables an augmented representation. In this case, it is further particularly preferred if the lens 7 is also used for correction of a visual deficiency of the observer.

If the second line grating is not formed on the material interface of the second lens 7 facing the observer, but on the other material interface, the lens 7 may also be employed for correction of a visual deficiency in the HMD operation where only the image generated by the image-generating unit 1 is perceivable.

Both line gratings 6 and 8 are preferably provided such that their grooves have the same depth. Of course, a varying groove depth is also possible. Further, the groove width of the line gratings 6 and 8 may be varied across the grating (in particular, perpendicular to the longitudinal direction of the grooves). Such a varying groove width leads to a focussing effect (imaging effect) of the grating which may be utilized to make the deflection optics 4 still more compact and lighter.

Although the description above contains many specificities, these should not be construed as limiting the scope of the invention but as merely providing illustrations of a presently preferred embodiment of the invention. Thus, the scope of the invention should be determined by the appended claims and their legal equivalents, rather than by the examples given.

The invention claimed is:

1. An HMD device comprising an image-generating unit for generating a polychromatic image and deflection optics comprising first and second partial optics, said deflection optics projecting the image such that it is perceivable by a user wearing said HMD device, wherein the two partial optics each contain a diffractive optical unit for beam deflection, which are designed such that their dispersion errors compensate each other, and wherein the second partial optics are arranged in front of the eye of a user wearing the HMD device so as to allow the user to perceive his environment through said optics, and the second partial optics have a refractive effect for correction of visual deficiencies of the user wearing the HMD device and the second partial optics have a curved material interface facing the user's eye, and wherein the diffractive optical unit of the second partial optics is located on the curved material interface and wherein the first partial optics have a first optical axis and the second partial optics have a second optical axis and wherein the first optical axis is substantially laterally displaced from and substantially parallel to the second optical axis and the diffractive optical unit of the first partial optics deflects light to the diffractive optical unit of the second partial optics.

2. The HMD device as claimed in claim 1, wherein use is made of a non-zeroth order of diffraction of the diffractive optical units for beam deflection.

3. The HMD device as claimed in claim 2, wherein the same order of diffraction is used for both diffractive optical units.

4. The HMD device as claimed in claim 1, wherein the diffractive optical unit of at least one of the first and second partial optics is provided as a line grating.

5. The HMD device as claimed in claim 4, wherein the line grating serves the purpose of beam deflection.

6. The HMD device as claimed in claim 4, wherein the line grating serves the purpose of beam deflection and also as an imaging optical element.

7. The HMD device as claimed in claim 6, wherein the grating constant of the line grating varies with respect to the imaging effect.

8. The HMD device as claimed in claim 4, wherein the line grating is formed on or in a curved material interface.

9. The HMD device as claimed in claim 8, wherein the material interface is spherically curved.

10. The HMD device as claimed in claim 9, wherein said deflection optics comprise a refractive element having a first and a second side, said first side being said spherically curved material interface.

11. The HMD device as claimed in claim 10, wherein said line grating formed on or in said spherically curved material interface is adapted to provide a desired aspherical effect.

12. The HMD device as claimed in claim 4, wherein the line grating is formed on or in a planar material interface.

13. The HMD device as claimed in claim 1, wherein the user can see through the diffractive optical unit of the second partial optics in the zeroth order of diffraction.

14. An HMD device comprising:
an image-generating unit for generating a polychromatic image;
deflection optics comprising first and second partial optics, said deflection optics projecting the image such that it is perceivable by a user wearing said HMD device,
wherein the two partial optics each contain a diffractive optical unit for beam deflection, which are designed such that their dispersion errors compensate each other;
wherein the second partial optics are arranged in front of the eye of a user wearing the HMD device so as to allow the user to perceive his environment through said optics, and
the second partial optics have a refractive effect for correction of visual deficiencies of the user wearing the HMD device and the second partial optics have a curved material interface facing the user's eye, wherein the diffractive optical unit of the second partial optics is located on the curved material interface; and
further wherein the first partial optics directs light to the second partial optics where the light is reflected and diffracted only from the curved material interface facing the user's eye to be directed to the user's eye.

15. The HMD device as claimed in claim 14, wherein use is made of a non-zeroth order of diffraction of the diffractive optical units for beam deflection.

16. The HMD device as claimed in claim 15, wherein the same order of diffraction is used for both diffractive optical units.

17. The HMD device as claimed in claim 14, wherein the diffractive optical unit of at least one of the first and second partial optics is provided as a line grating.

18. The HMD device as claimed in claim 17, wherein the line grating serves the purpose of beam deflection.

19. The HMD device as claimed in claim 17, wherein the line grating only serves the purpose of beam deflection and also as an imaging optical element.

20. The HMD device as claimed in claim 19, wherein the grating constant of the line grating varies with respect to the imaging effect.

21. The HMD device as claimed in claim 17, wherein the line grating is formed on or in a curved material interface.

22. The HMD device as claimed in claim 21, wherein the material interface is spherically curved.

23. The HMD device as claimed in claim 22, wherein said deflection optics comprise a refractive element having a first and a second side, said first side being said spherically curved material interface.

24. The HMD device as claimed in claim 23, wherein said line grating formed on or in said spherically curved material interface is adapted to provide a desired aspherical effect.

25. The HMD device as claimed in claim 17, wherein the line grating is formed on or in a planar material interface.

26. The HMD device as claimed in claim 14, wherein the user can see through the diffractive optical unit of the second partial optics in the zeroth order of diffraction.

* * * * *